Sept. 15, 1925.

E. T. CAMERON 1,553,434

RETAINING DOG FOR BALING PRESS CHAMBERS

Filed April 21, 1925    2 Sheets-Sheet 1

Inventor
EMMETT T. CAMERON,
By
Attorney

Sept 15, 1925.

E. T. CAMERON 1,553,434

RETAINING DOG FOR BALING PRESS CHAMBERS

Filed April 21, 1925   2 Sheets-Sheet 2

Inventor
EMMETT T. CAMERON,
By
Attorney

Patented Sept. 15, 1925.

1,553,434

UNITED STATES PATENT OFFICE.

EMMETT TAYLOR CAMERON, OF HONDO, TEXAS.

RETAINING DOG FOR BALING-PRESS CHAMBERS.

Application filed April 21, 1925. Serial No. 24,823.

*To all whom it may concern:*

Be it known that I, EMMETT T. CAMERON, a citizen of the United States, residing at Hondo, in the county of Medina and State of Texas, have invented certain new and useful Improvements in Retaining Dogs for Baling-Press Chambers, of which the following is a specification.

My invention relates to improvements in retaining dogs, for presses, such as cotton presses.

An important object of the invention is to provide means of the above mentioned character, of simplified construction, which is adapted to hold the retaining dogs in the normal or starting position, allow the same to be shifted, in opposite directions from this position, and to automatically return the same to such position.

Other objects and advantages of the invention will be apparent during the course of the following description.

Figure 1:
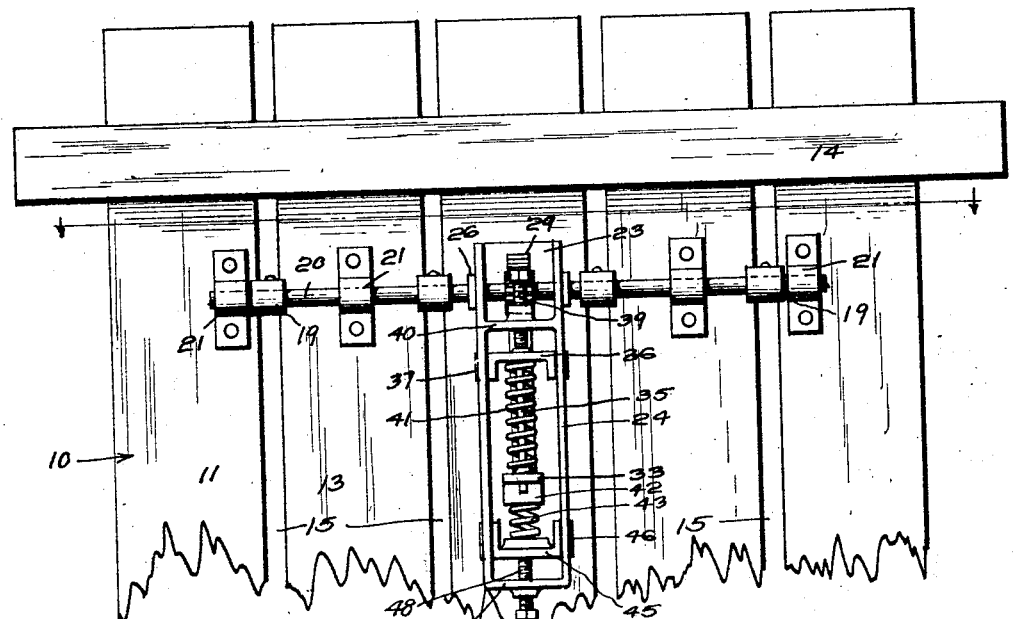
Figure 2:
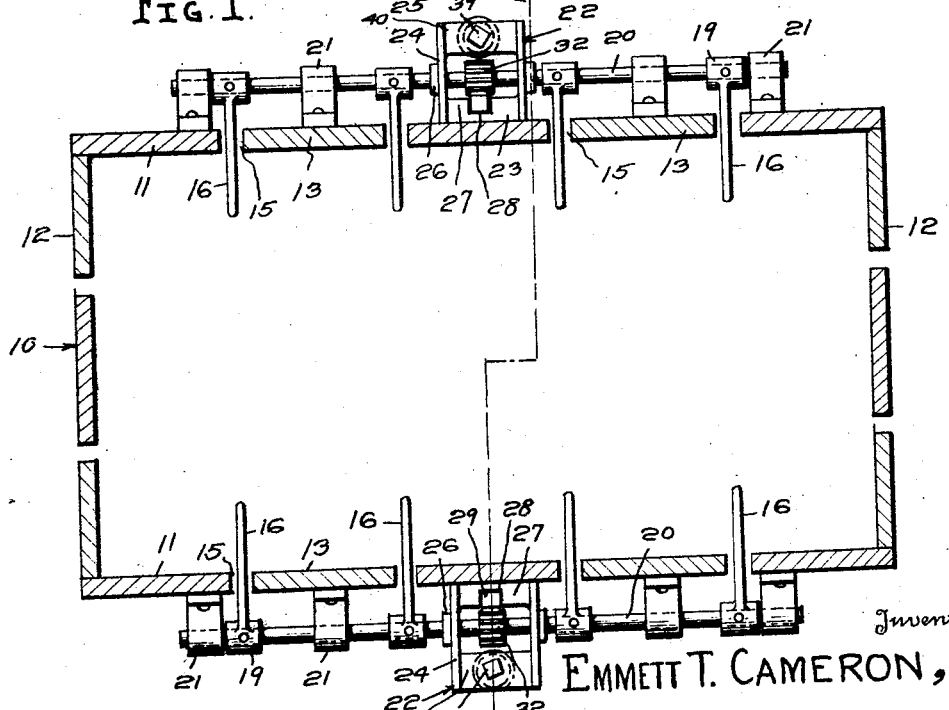
Figure 3:
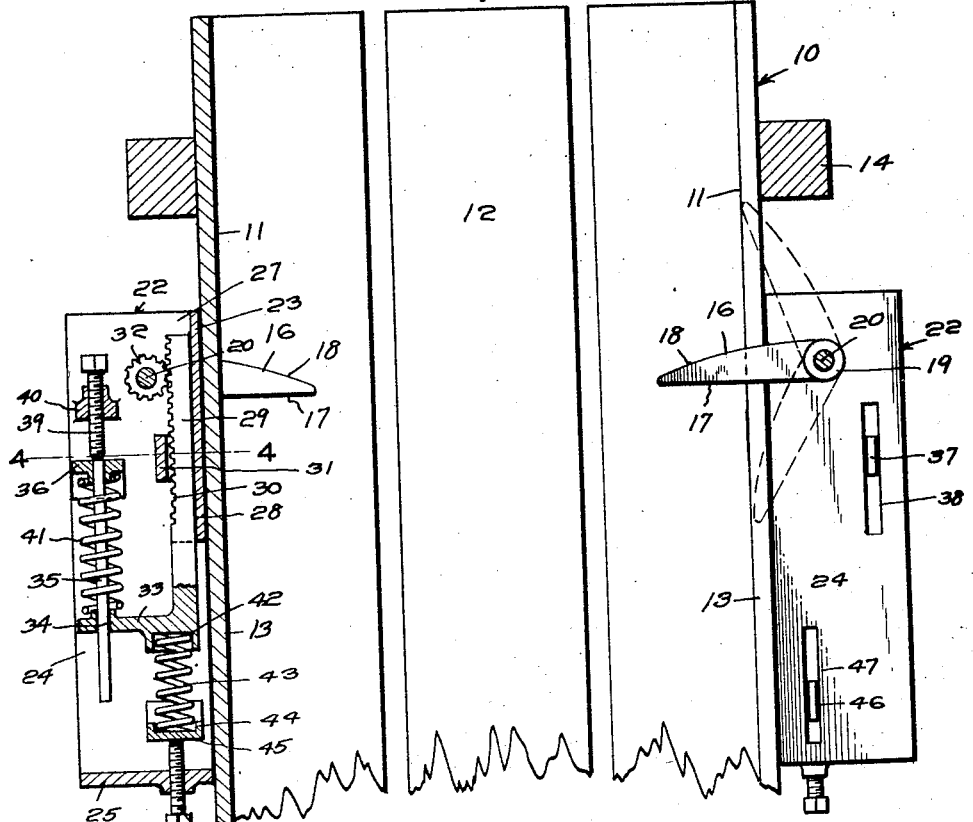
Figure 4:
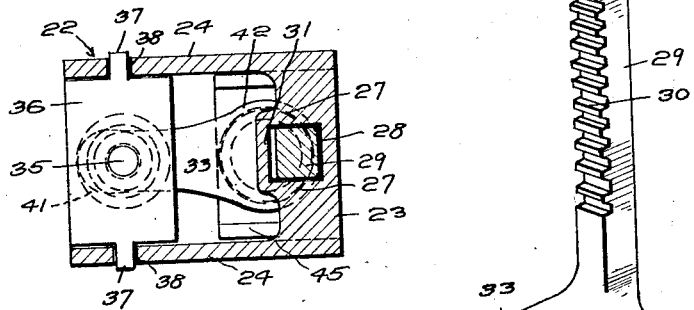
Figure 5:
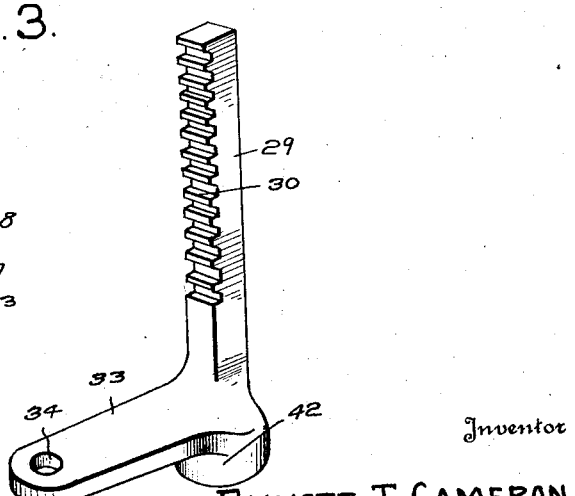

In the accompanying drawings forming a part of this specification and in which like numerals are employed to designate like parts throughout the same, Figure 1 is side elevation of apparatus embodying my invention, Figure 2 is a horizontal section taken on line 2—2 of Figure 1, Figure 3 is a vertical section taken on line 3—3 of Figure 2, Figure 4 is a horizontal section taken on line 4—4 of Figure 3, and, Figure 5 is a perspective view of the reciprocatory element or rack.

In the drawings, wherein for the purpose of illustration is shown a preferred embodiment of my invention, the numeral 10 designates a baling press chamber as a whole, embodying sides 11, and ends 12. The sides embody vertical spaced boards or strips 13, connected by beams 14, affording vertical openings 15. The baling press chamber may be of any well known or preferred construction.

Arranged adjacent to the opposite sides 11 are sets of retaining dogs 16, projecting through the openings 15, and adapted to operate within the baling chamber, for holding the cotton down, as it is fed or packed into the baling chamber. These sets of dogs in the normal or starting position are substantially horizontal and have lower straight edges 17, and upper inclined or curved edges 18, extending downwardly toward the center of the baling chamber. Each set of retaining dogs 16 is provided at their outer ends with heads 19, which are mounted upon a horizontal rock shaft 20, and clamped thereto by any suitable means. The rock shaft is disposed horizontally outwardly of and near the side 11, and this rock shaft is journaled within bearings 21, which are bolted or otherwise rigidly attached to the side.

Associated with each rock shaft 20 is a housing 22, embodying a front wall 23, side walls 24, and a bottom 25. This housing is arranged in contact with the strip 13 of the side 11. The side walls 24 are provided with openings rotatably receiving the rock shaft 20, and stop element or rings 26 are rigidly mounted upon the shaft 20, and slidably contact with the opposite side walls 24, thus preventing longitudinal displacement of the housing, with respect to the shaft. The longitudinal displacement of the shaft 20 is prevented by the heads 19 of the end retaining dogs 16 contacting with the end bearings 21, as shown. If desired, the housing could of course be rigidly attached to the side of the baling chamber by any suitable means. Formed upon the inner or front wall 23 are guide ribs 27, which are spaced, to afford a groove or opening 28, slidably receiving a reciprocatory element 29, in the form of a rack bar, having rack teeth 30. A guide socket 31 is preferably formed integral with the ribs 27, and slidably receives the rack bar, retaining the same within the groove 28. Rigidly mounted upon the rock shaft 20 is a gear 32, disposed within the housing 22 and permanently engaging the rack teeth 30.

The rack bar 29 is provided at its lower end with an outwardly projecting horizontal arm or extension 33, preferably formed integral therewith. This arm has an opening 34, for receiving the lower portion of a guide rod 35. This guide rod is vertically disposed and is rigidly attached to a slide or carriage 36. This slide or carriage is provided upon its end with vertical ribs 37, slidable within elongated slots 38. The slide 36 is engaged by an adjusting bolt 39, having screw-threaded engagement with a transverse bridge 40, formed integral with the upper portions of the side walls 24. A compressible coil spring 41, surrounds the guide rod 35, and is confined between the slide 36 and the arm 33, as shown. It is thus seen that the tension of the spring 41 may be regulated by manipulating the bolt 39. The arm 33 is provided at its inner end with a depending socket 42, receiving the upper end of a compressible coil spring 43, the lower end of which is held within a socket 44, formed in a lower slide or carriage 45. This lower slide or carriage is mounted between the side walls 24, and is provided with vertical ribs 46, and these vertical ribs operate within elongated slots 47, Figure 3. Arranged beneath the slide 45 is an adjusted bolt 48, engaging the bottom thereof, and this adjusting bolt has screw-threaded engagement with the bottom 25. It is obvious that the tension of the spring 43 may be varied by manipulation of the bolt 48.

In operation, the retaining dogs 16 are substantially horizontally arranged, Figure 3, when in the normal or starting position. When the retaining dogs are in this position, the springs 41 and 43, are substantially free from any considerable tension, and function to retain the dogs in the substantially horizontal position. As the cotton is fed into the baling chamber, the retaining dogs 16 may be depressed, as they are held elevated by the compressible coil spring 43. These dogs may be depressed by the downward movement of the plunger (not shown). When the dogs are released they are again returned to the horizontal position and serve to hold the cotton against upward movement within the baling chamber. The retaining dogs may be moved upwardly by the action of the cotton, as the pressure increases within the baling chamber or they may be moved upwardly by the action of the plunger, as they are held against upward movement by the compressible coil spring 41. As indicated in dotted lines in Figure 3, the retaining dogs may be shifted to lower and upper positions, with their free ends out of the baling chamber. It will be seen that the construction is extremely simple, considering operations possible by the retaining dogs, and the retaining dogs may move upwardly or downwardly, out of the path of travel of the plunger. The retaining dogs are urged downwardly toward the horizontal position, by the spring, and hence are adapted to maintain a constant downward yielding action upon the cotton, and this will eliminate the formation of air pockets, in the bale, when the ram or cylinder is raised.

It is to be understood that the form of my invention herewith shown and described is to be taken as a preferred example of the same, and that various changes in the shape, size and arrangement of parts may be resorted to without departing from the spirit of my invention or the scope of the subjoined claims.

Having thus described by invention, I claim:

1. In a device of the character described, retaining dogs for a baling press chamber adapted to operate within said chamber to hold the cotton down, and resilient means to hold the dogs in the normal or starting position and adapted to oppose their movements in both directions from said normal or starting position.

2. In a device of the character described, retaining dogs for a baling press chamber adapted to operate within said chamber to hold the cotton down, resilient means to oppose the movement of said dogs in one direction from the normal or starting position, and resilient means to oppose the movement of said dogs in an opposite direction from the normal or starting position.

3. In a device of the character described, retaining dogs for a baling press chamber adapted to operate within said chamber to hold the cotton down, resilient means to oppose the movement of said dogs in one direction from the normal or starting position, resilient means to oppose the movement of said dogs in an opposite direction from the normal or starting position, and means to adjust the tension of each resilient means.

4. The combination of a baling chamber, of a rock shaft arranged adjacent to the same, dog or dogs moved by the rock shaft and extending into the baling chamber, a gear mounted upon the rock shaft, a rack bar engaging the gear, and yielding means to oppose the movement of the rack bar in one direction.

5. Retaining dogs for a baling press chamber adapted to operate within said chamber to hold the cotton or the like down, means including a reciprocatory element connected with the dogs to move upon the movement of said dogs, and yielding means to oppose the movement of the reciprocatory element in both directions.

6. Retaining dogs for a baling press chamber adapted to operate within said chamber to hold the cotton or the like down, a rock shaft carrying the dogs, a gear connected with the rock shaft, a reciprocatory rack bar engaging the gear, and yielding means to oppose the movements of the rack bar in opposite directions.

7. Retaining dogs for a baling press chamber adapted to operate within said chamber to hold the cotton or the like down, a rock shaft moved by the movement of said dogs, a gear turned by said rock shaft, a reciprocatory rack bar engaging said gear, resilient means opposing the movement of the rack bar in one direction, and resilient means opposing the movement of the rack bar in the opposite direction.

8. Retaining dogs for a baling press chamber adapted to operate within said chamber to hold the cotton or the like down, a rock shaft moved by the movement of said dogs, a gear turned by said rock shaft, a reciprocatory rack bar engaging said gear, resilient means opposing the movement of the rack bar in one direction, means to adjust the tension of the resilient means, resilient means opposing the movement of the rack bar in an opposite direction, and means to adjust the tension of the second named resilient means.

9. Retaining dogs for a baling press chamber adapted to operate within said chamber to hold the cotton or the like down, a rock shaft moved by the movement of said dogs, a gear turned by said rock shaft, a co-acting gear element engaging the first named gear, and yielding means to oppose the movement of said gear element in opposite directions.

In testimony whereof I affix my signature.

EMMETT TAYLOR CAMERON.